US012146453B2

(12) United States Patent
Schrell (10) Patent No.: US 12,146,453 B2
(45) Date of Patent: Nov. 19, 2024

(54) MIXED FLOW EXHAUST THRUST REVERSER WITH AREA CONTROL NOZZLE SYSTEMS AND METHODS

(71) Applicant: ROHR, INC., Chula Vista, CA (US)

(72) Inventor: Johann Steven Schrell, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/299,526

(22) Filed: Apr. 12, 2023

(65) Prior Publication Data
US 2023/0272760 A1    Aug. 31, 2023

Related U.S. Application Data

(62) Division of application No. 17/532,673, filed on Nov. 22, 2021, now Pat. No. 11,649,785.

(51) Int. Cl.
*F02K 1/70* (2006.01)
*F02K 1/12* (2006.01)
*F02K 1/76* (2006.01)

(52) U.S. Cl.
CPC .............. *F02K 1/70* (2013.01); *F02K 1/1223* (2013.01); *F02K 1/763* (2013.01); *F05D 2220/323* (2013.01); *F05D 2240/128* (2013.01); *F05D 2260/57* (2013.01); *F05D 2260/605* (2013.01)

(58) Field of Classification Search
CPC ........ F02K 1/15; F02K 1/1223; F02K 1/1207; F02K 1/70; F02K 1/62; F02K 1/763; F05D 2220/323
See application file for complete search history.

(56) References Cited

U.S. PATENT DOCUMENTS

| 4,382,551 A | 5/1983 | Thayer |
| 4,591,097 A | 5/1986 | Thayer |
| 4,778,109 A | 10/1988 | Jourdain et al. |

(Continued)

FOREIGN PATENT DOCUMENTS

| FR | 1545059 | 11/1968 |
| GB | 2429242 | 2/2007 |

OTHER PUBLICATIONS

European Patent Office, European Office Action dated Mar. 23, 2023 in Application No. 22208647.2.

(Continued)

*Primary Examiner* — Andrew H Nguyen
(74) *Attorney, Agent, or Firm* — SNELL & WILMER L.L.P.

(57) ABSTRACT

An articulating exhaust nozzle thrust reverser includes an outer articulating panel comprising an outer skin and an outer thrust reverser door and an inner articulating panel comprising a forward inner skin, an aft inner skin, and an inner thrust reverser door. The outer articulating panel is configured to pivot to vary a nozzle exit area. The forward inner skin is configured to pivot to vary a nozzle throat area. The outer thrust reverser door is pivotally coupled to the outer skin. The inner thrust reverser door is pivotally coupled to the aft inner skin. The outer articulating panel and the inner articulating panel may be individually operated to independently vary the exhaust nozzle throat area and/or the exhaust nozzle exit area.

3 Claims, 10 Drawing Sheets

(56) References Cited

U.S. PATENT DOCUMENTS

| | | | | |
|---|---|---|---|---|
| 4,836,451 | A | * | 6/1989 | Herrick .................. F02K 1/123 |
| | | | | 60/229 |
| 5,016,818 | A | | 5/1991 | Nash et al. |
| 5,103,639 | A | * | 4/1992 | Wolf ..................... F02K 1/1223 |
| | | | | 60/242 |
| 5,120,005 | A | | 6/1992 | Reedy |
| 5,154,052 | A | | 10/1992 | Griffin, III et al. |
| 5,779,150 | A | * | 7/1998 | Lidstone ................ F02K 1/383 |
| | | | | 239/265.17 |
| 2016/0146113 | A1 | * | 5/2016 | Zatorski ................. F01D 25/06 |
| | | | | 415/151 |

OTHER PUBLICATIONS

European Patent Office, European Search Report dated Jun. 30, 2023 in Application No. 22208647.2.
USPTO; Requirement for Restriction dated Oct. 20, 2023 in U.S. Appl. No. 17/532,673.
USPTO; Notice of Allowance dated Jan. 19, 2023 in U.S. Appl. No. 17/532,673.

* cited by examiner

MIXED FLOW EXHAUST THRUST REVERSER WITH AREA CONTROL NOZZLE SYSTEMS AND METHODS

CROSS-REFERENCE TO RELATED APPLICATIONS

This application is a divisional of, and claims priority to, U.S. patent application Ser. No. 17/532,673 filed on Nov. 22, 2021, entitled "MIXED FLOW EXHAUST THRUST REVERSER WITH AREA CONTROL NOZZLE SYSTEMS AND METHODS," which is incorporated by reference herein in its entirety for all purposes.

FIELD

The present disclosure relates generally to aircraft nozzles and thrust reversers used with gas turbine engines and, more particularly, to mixed flow exhaust nozzles incorporating thrust reversers

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include a thrust reverser capable of redirecting the mixed exhaust stream from a rearward direction to, at least partially, a forward direction thus producing a rearward thrust that may serve to decelerate forward motion of an aircraft and thereby assist braking the aircraft upon landing.

SUMMARY

An exhaust nozzle for an aircraft engine nacelle is disclosed, comprising a forward bulkhead, an outer articulating panel comprising an outer skin and an outer thrust reverser door, the outer articulating panel is configured to pivot with respect to the forward bulkhead, an inner articulating panel comprising a forward inner skin, an aft inner skin, and an inner thrust reverser door, the inner articulating panel configured to pivot with respect to the forward bulkhead, a nozzle throat at least partially defined at an interface between the forward inner skin and the aft inner skin, a nozzle exit at least partially defined at an aft end of the inner articulating panel, a first nozzle actuator configured to vary an angle of the outer articulating panel with respect to the forward bulkhead, and a second nozzle actuator configured to vary an angle of the forward inner skin with respect to the forward bulkhead. A nozzle throat area of the nozzle throat is configured to be varied by the second nozzle actuator independent of a nozzle exit area of the nozzle exit. The nozzle exit area is configured to be varied by the first nozzle actuator independent of the nozzle throat area.

In various embodiments, the exhaust nozzle further comprises a flap pivotally coupled to the forward bulkhead, wherein the outer skin is slidingly coupled to the flap, and the outer skin translates with respect to the flap in response to the angle of the outer articulating panel varying with respect to the forward bulkhead to maintain a continuous aerodynamic outer surface of the exhaust nozzle.

In various embodiments, the outer skin is configured to pivot with respect to the forward bulkhead independent of the forward inner skin.

In various embodiments, the exhaust nozzle further comprises a first thrust reverser actuator configured to move the outer thrust reverser door between a stowed position and a deployed position.

In various embodiments, the exhaust nozzle further comprises a second thrust reverser actuator configured to move the inner thrust reverser door between a stowed position and a deployed position.

In various embodiments, the first nozzle actuator and the second nozzle actuator are configured to operate in concert to vary either the nozzle throat area or the nozzle exit area and either maintain or vary the other of the nozzle throat area and the nozzle exit area.

In various embodiments, the nozzle exit area comprises a substantially rectangular geometry.

In various embodiments, the exhaust nozzle further comprises a sliding joint offset from the interface between the forward inner skin and the aft inner skin, wherein the forward inner skin and the aft inner skin are coupled together at the sliding joint.

In various embodiments, the exhaust nozzle further comprises a linear joint coupled between the first nozzle actuator and the outer articulating panel, the linear joint configured to transmit lateral loads between the forward bulkhead and the outer articulating panel.

A thrust reverser is disclosed, comprising an outer articulating panel and an inner articulating panel. The outer articulating panel comprises an outer skin and an outer thrust reverser door. The outer articulating panel is configured to pivot to vary a nozzle exit area. The inner articulating panel comprises a forward inner skin, an aft inner skin, and an inner thrust reverser door. The forward inner skin is configured to pivot to vary a nozzle throat area. The outer thrust reverser door is pivotally coupled to the outer skin, and the inner thrust reverser door is pivotally coupled to the aft inner skin.

In various embodiments, a nozzle throat is at least partially defined at an interface between the forward inner skin and the aft inner skin.

In various embodiments, a nozzle exit is at least partially defined at an aft end of the inner articulating panel.

In various embodiments, the thrust reverser further comprises a first thrust reverser actuator configured to pivot the outer thrust reverser door with respect to the outer skin between a deployed position and a stowed position.

In various embodiments, the thrust reverser further comprises a second thrust reverser actuator configured to pivot the inner thrust reverser door with respect to the aft inner skin between a deployed position and a stowed position.

In various embodiments, the thrust reverser further comprises a first nozzle actuator configured to pivot the outer articulating panel.

In various embodiments, the thrust reverser further comprises a second nozzle actuator configured to pivot the forward inner skin.

In various embodiments, the thrust reverser further comprises a first linear joint disposed between the first nozzle actuator and the outer articulating panel, and a second linear joint disposed between the second nozzle actuator and the forward inner skin.

In various embodiments, the thrust reverser further comprises a third linear joint disposed between the first thrust reverser actuator and the outer thrust reverser door, and a fourth linear joint disposed between the second thrust reverser actuator and the inner thrust reverser door.

In various embodiments, the thrust reverser further comprises a flap located at a forward edge of the outer skin, wherein the flap is slidingly coupled to the outer skin to maintain a continuous aerodynamic surface while the outer articulating panel pivots.

A method for articulating an exhaust nozzle to vary at least one of a nozzle throat area and a nozzle exit area is disclosed, the method comprising moving a first nozzle actuator to vary an angle of an outer articulating panel of the exhaust nozzle with respect to a forward bulkhead and to either maintain or vary the nozzle exit area, moving a second nozzle actuator to vary an angle of an inner articulating panel of the exhaust nozzle with respect to the forward bulkhead, and varying an angle between a forward inner skin of the inner articulating panel and an aft inner skin of the inner articulating panel in response to performing the step of moving the second nozzle actuator to either maintain or vary the nozzle throat area.

In various embodiments, the method further comprises moving a first thrust reverser actuator to pivot an outer thrust reverser door between a stowed position and a deployed position, wherein the outer thrust reverser door is pivotally mounted to an outer skin of the outer articulating panel, and moving a second thrust reverser actuator to pivot an inner thrust reverser door between a stowed position and a deployed position, wherein the inner thrust reverser door is pivotally mounted to an aft inner skin of the inner articulating panel.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

An articulating exhaust nozzle for a mixed flow (i.e., fan duct and core) nacelle of the present disclosure incorporates features for independently controlling the nozzle throat (A8) and nozzle exit (A9). An articulating exhaust nozzle of the present disclosure further incorporates a thrust reverser (also referred to as a "clamshell" type thrust reverser). An articulating exhaust nozzle of the present disclosure may be suitable for high Mach number aircraft applications. An articulating exhaust nozzle of the present disclosure may be suitable for a rectangular exhaust duct.

Figures 1A, 1B:
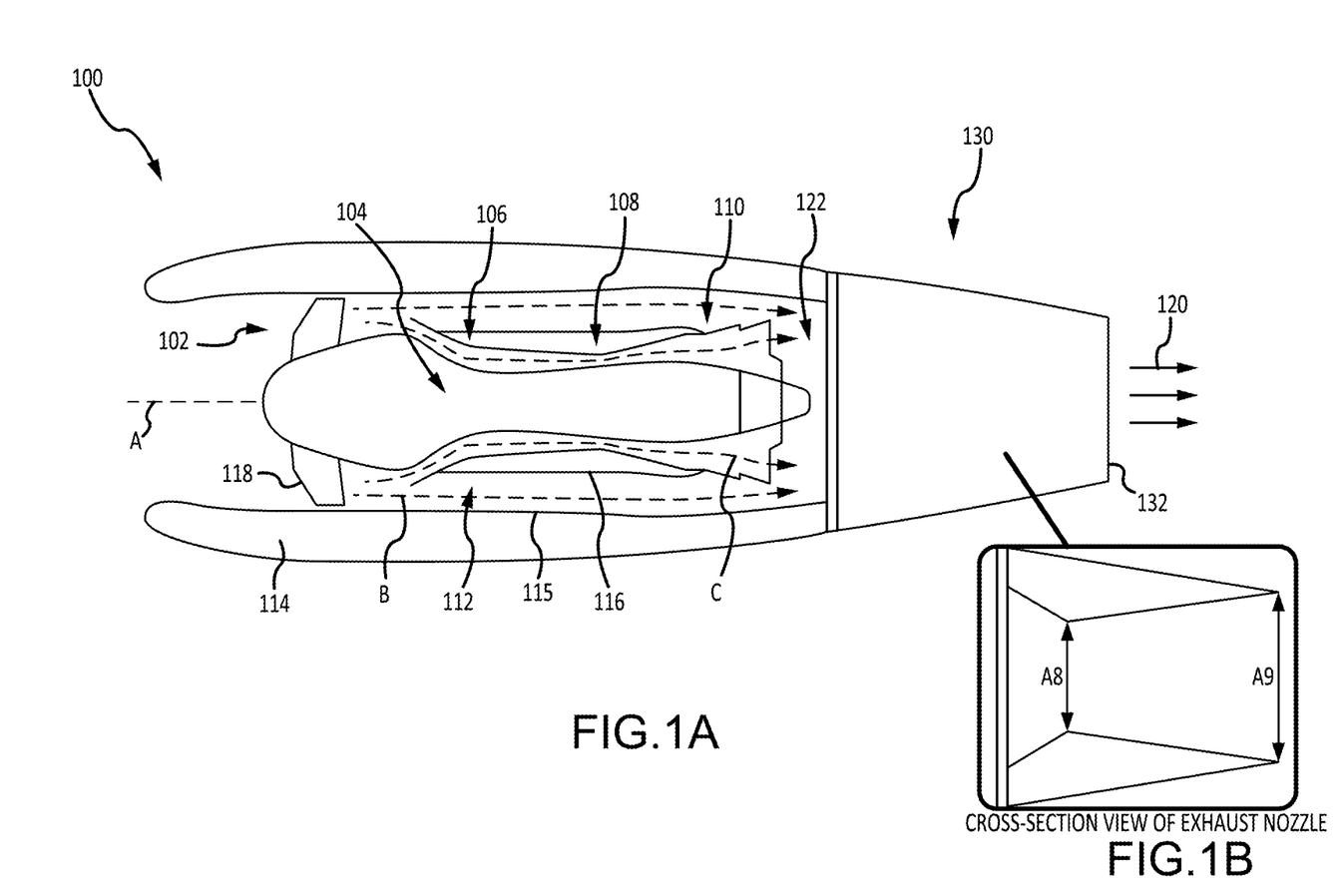
FIG. 1A provides a schematic view of a gas turbine engine including a nozzle arrangement, in accordance with various embodiments.
FIG. 1B provides a cross-section view of the nozzle arrangement of FIG. 1A, in accordance with various embodiments.

Referring now to the drawings, FIG. 1A schematically illustrates a gas turbine engine 100 of a mixed flow exhaust turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 (also referred to herein as an exhaust nozzle) is mounted to the aft end of the gas turbine engine 100. The thrust reverser 130 includes an exhaust duct 132, which defines an outer boundary for discharging the mixed exhaust stream 120 when the thrust reverser 130 assumes a stowed position (also referred to as a closed position or a retracted position), as illustrated in FIG. 1A. In various embodiments, exhaust duct 132 defines a substantially rectangular outer boundary for discharging the mixed exhaust stream 120 when the thrust reverser 130 assumes the stowed position. As discussed below, thrust reversal is affected by opening reverser doors to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Referring now to FIG. 1B, a cross-section view of thrust reverser 130 is illustrated, in accordance with various embodiments. Thrust reverser 130 may comprise an outer articulating panel and a lower articulating panel, as described herein in further detail, each having articulating components that can move to independently vary a throat area A8 and a nozzle exit area A9. In this manner, a thrust reverser of the present disclosure is capable of varying the nozzle throat area A8 independent of the nozzle exit area A9.

Figure 2:
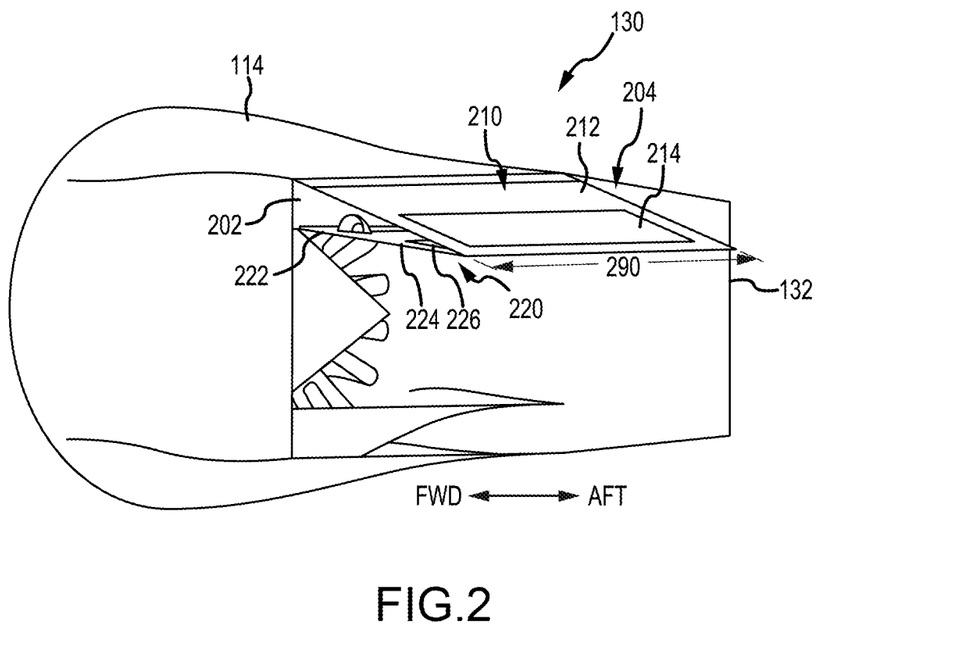
FIG. 2 provides a partial section, perspective rear view of a nozzle and thrust reverser, in accordance with various embodiments.
Figure 3:
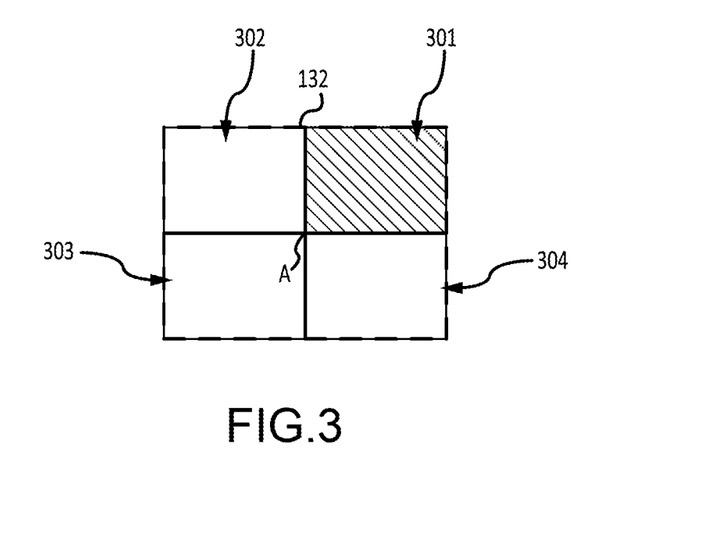
FIG. 3 provides a schematic, profile view of four quadrants of a thrust reverser, in accordance with various embodiments.

Referring now to FIG. 2, a perspective view of a section of thrust reverser 130 in a stowed position is illustrated, in accordance with various embodiments. It should be appreciated that for ease of illustration, only an upper portion of the thrust reverser 130 is illustrated, and that a lower portion will also be provided, similar to that of the upper section (e.g., in a mirror configuration; see FIG. 1B). Moreover, it should be appreciated that for ease of illustration, FIG. 4A through FIG. 5E illustrate only a half of the upper portion of the thrust reverser 130, and that the other half will also be provided (e.g., in a mirror configuration). Stated differently, with momentary reference to FIG. 3, the illustrated embodiments of FIG. 4A through FIG. 5E depict the details of only a quadrant 301 of the thrust reverser 130. Quadrant 302 may generally be a mirror image of quadrant 301. Likewise, quadrants 303 and 304 may generally be mirror images of quadrants 302 and 301, respectively (see FIG. 1B). Exhaust duct 132 may define a substantially rectangular geometry. FIG. 2 illustrates a perspective view of the details of quadrants 301 and 302 of thrust reverser 130, with one sidewall (i.e., the left sidewall in FIG. 2) removed for ease of illustration.

With reference to FIG. 2, thrust reverser 130 includes a forward bulkhead 202. Thrust reverser 130 further includes an exhaust nozzle door 204 (also referred to herein as a first articulating exhaust nozzle door). It should be understood that although FIG. 2 illustrates only the first (top) articulating exhaust nozzle door, the thrust reverser 130 further includes a second (bottom) articulating exhaust nozzle door, similar to that of the first articulating exhaust nozzle door, and in mirror configuration (see FIG. 1B). The bottom exhaust nozzle door is omitted for ease of illustration.

Exhaust nozzle door 204 may comprise an outer articulating panel 210 comprising an outer skin 212 and an outer thrust reverser door 214. The outer articulating panel 210 may be configured to pivot with respect to the forward bulkhead 202. Outer articulating panel 210 may comprise a width substantially equal to the width 290 of the thrust reverser 130 exhaust outlet. Thrust reverser door 214 may be mounted to outer skin 212. Thrust reverser door 214 may be configured to pivot with respect to outer skin 212.

Exhaust nozzle door 204 may further comprise an inner articulating panel 220 comprising a forward inner skin 222, an aft inner skin 224, and an inner thrust reverser door 226. Inner articulating panel 220 may be configured to pivot with respect to the forward bulkhead 202. Inner articulating panel 220 may be configured to pivot with respect to the forward bulkhead 202 independent of outer articulating panel 210. More particularly, outer skin 212 may be configured to pivot with respect to forward bulkhead 202 independent of forward inner skin 222. Likewise, forward inner skin 222 may be configured to pivot with respect to forward bulkhead 202 independent of outer skin 212.

Inner articulating panel 220 may comprise a width substantially equal to the width 290 of the thrust reverser 130 exhaust outlet. Inner thrust reverser door 226 may be mounted to aft inner skin 224. Inner thrust reverser door 226 may be configured to pivot with respect to aft inner skin 224.

In various embodiments, forward inner skin 222, aft inner skin 224, and/or inner thrust reverser door 226 may be acoustically treated (e.g., with a honeycomb core or other suitable core) to reduce the overall acoustic signature of thrust reverser 130.

The forward end of inner articulating panel 220 may be disposed radially from the forward end of outer articulating panel 210. The aft end of inner articulating panel 220 may be located at the aft end of outer articulating panel 210. In various embodiments, the aft end of inner articulating panel 220 is connected to the aft end of outer articulating panel 210. In this manner, inner articulating panel 220 and outer articulating panel 210 may form a wedge shape, in accordance with various embodiments. The nozzle exit may be at least partially defined at the aft end of the inner articulating panel 220.

Figure 4A:
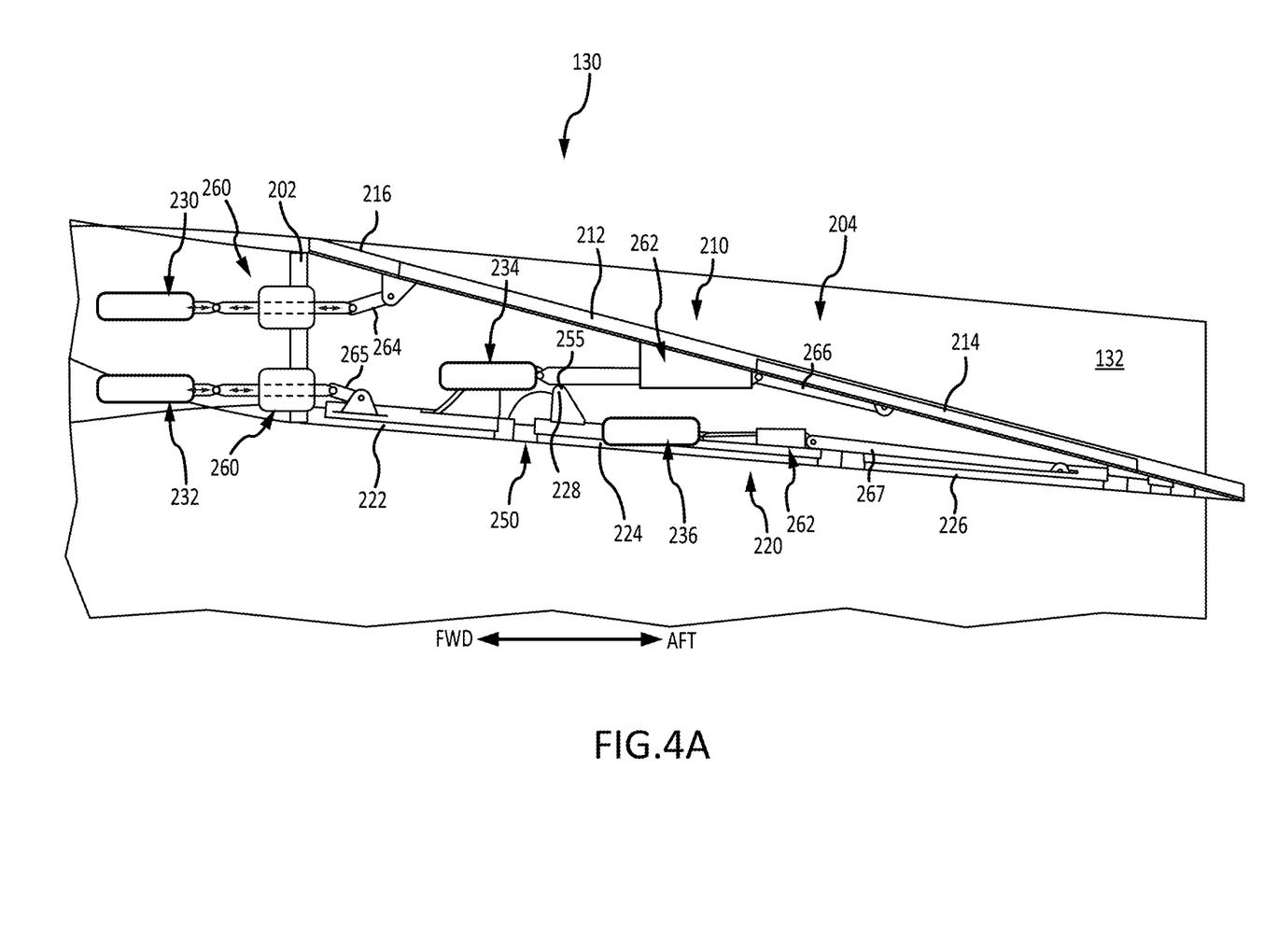
FIG. 4A provides a section view of an upper quadrant of a thrust reverser, in accordance with various embodiments.

Referring now to FIG. 4A, thrust reverser 130 may further include a first nozzle actuator 230 configured to vary an angle of the outer articulating panel 210 with respect to the forward bulkhead 202. First nozzle actuator 230 may be a linear actuator. The nozzle exit area (e.g., see nozzle exit area A9 of FIG. 1B) is configured to be varied by the first nozzle actuator 230 and second nozzle actuator 232 independent of the nozzle throat area (e.g., see nozzle throat area A8 of FIG. 1B). For example, first nozzle actuator 230 may retract to pivot outer articulating panel 210 inward to reduce the nozzle exit area. Conversely, first nozzle actuator 230 may extend to pivot outer articulating panel 210 outward to increase the nozzle exit area. In both cases, the second nozzle actuator 232 may extend or retract to maintain or change the throat area A8 simultaneously with the movement of first nozzle actuator 230.

Thrust reverser 130 may further include a second nozzle actuator 232 configured to vary an angle of the forward inner skin 222 with respect to the forward bulkhead 202. Second nozzle actuator 232 may be a linear actuator. A nozzle throat area (e.g., see throat area A8 of FIG. 1B) of the nozzle throat is configured to be varied by the second nozzle actuator 232 independent of a nozzle exit area (e.g., see nozzle exit area A9 of FIG. 1B) of the nozzle exit. The nozzle throat may be at least partially defined at the interface of forward inner skin 222 and aft inner skin 224. The angle between forward inner skin 222 and aft inner skin 224 may vary in response to second nozzle actuator 232 pivoting forward inner skin 222 with respect to forward bulkhead 202. For example, second nozzle actuator 232 may extend to pivot forward inner skin 222 inward to reduce the nozzle throat area. Conversely, second nozzle actuator 232 may retract to pivot forward inner skin 222 outward to increase the nozzle throat area. The aft end of forward inner skin 222 and the forward end of aft inner skin 224 may be pivotally connected to each other.

Figure 5A:
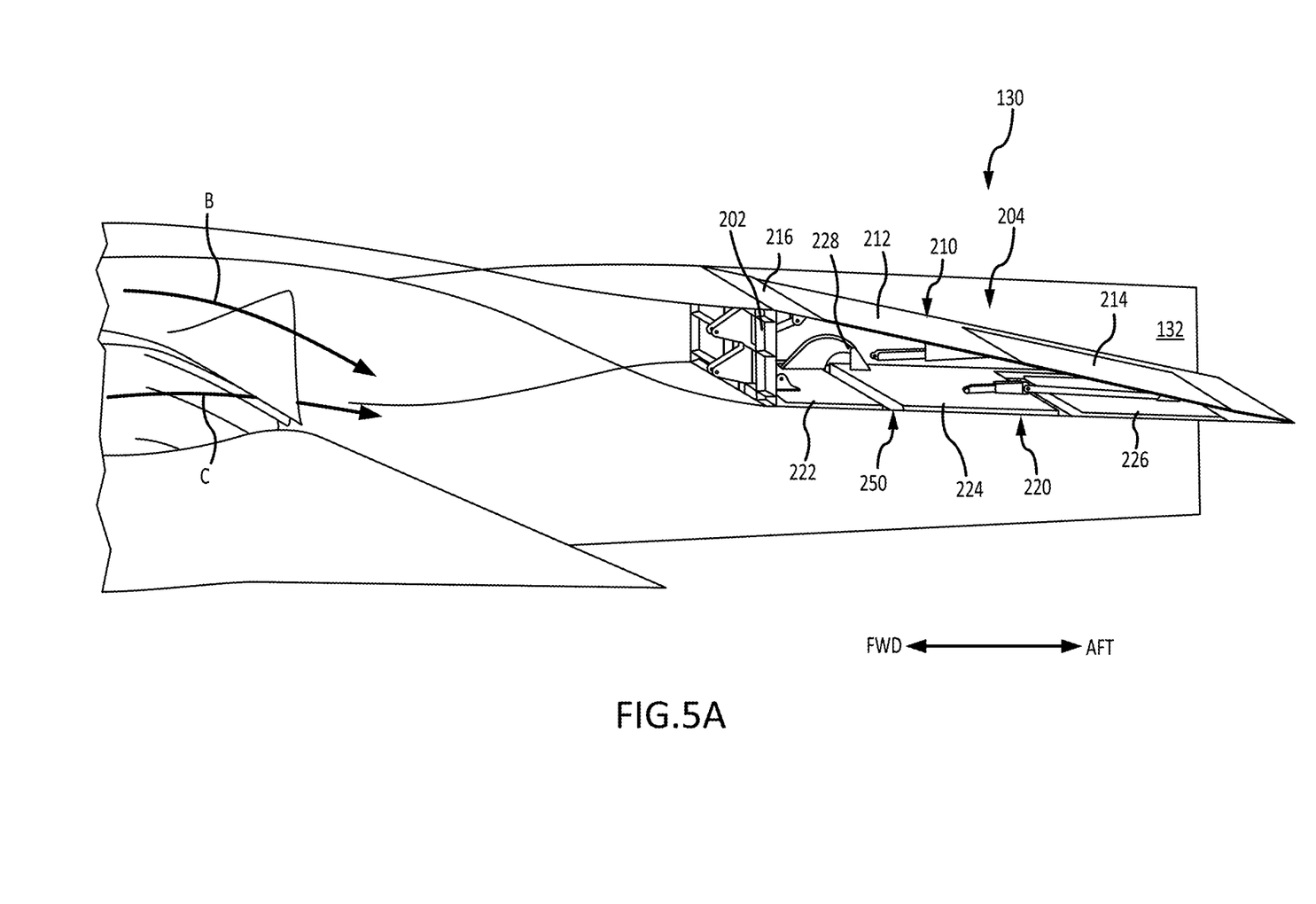
FIG. 5A provides a perspective section view of the upper quadrant of the thrust reverser of FIG. 4A in a first position, in accordance with various embodiments.
Figure 5B:
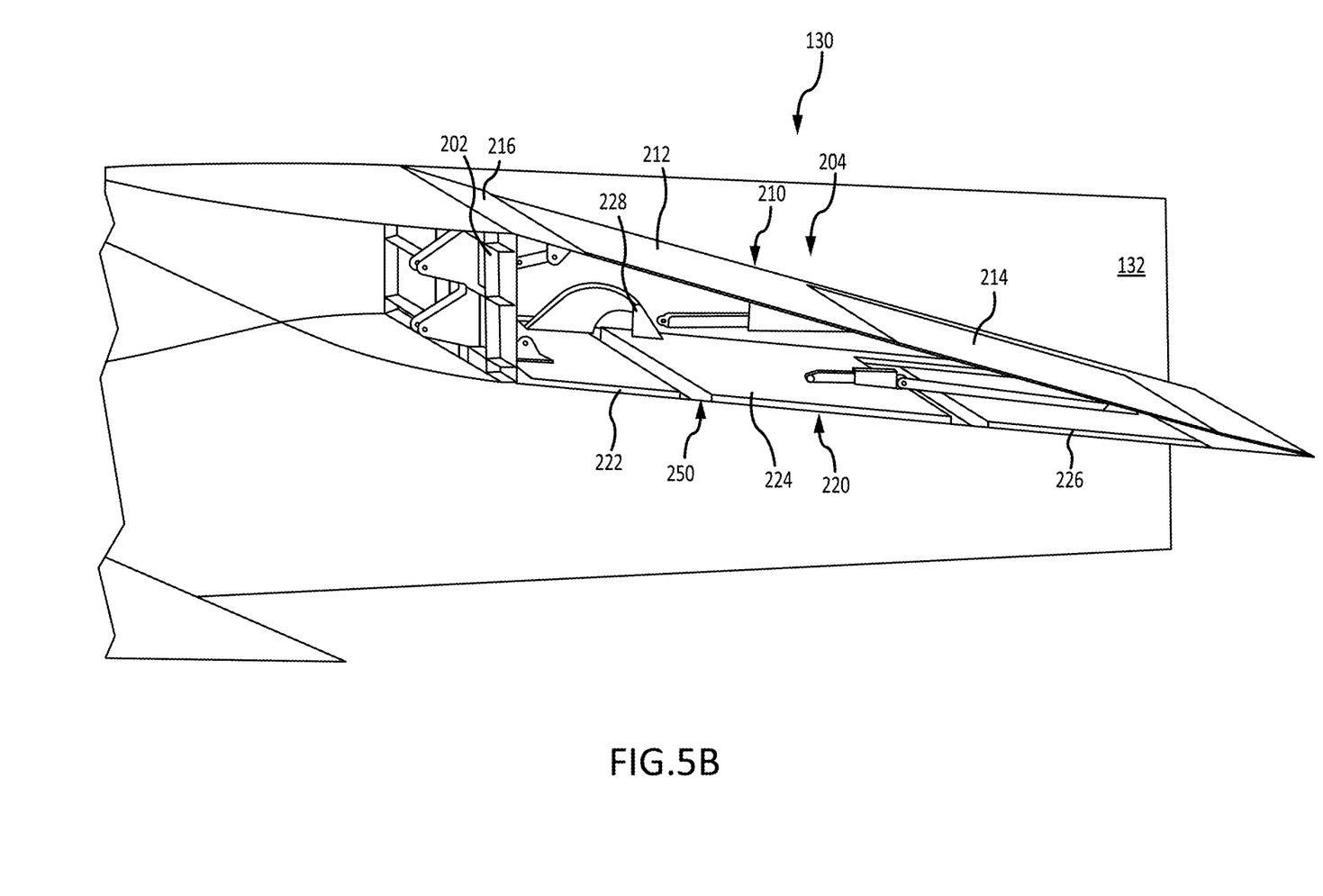
FIG. 5B provides a perspective section view of the upper quadrant of the thrust reverser of FIG. 5A in a second position, in accordance with various embodiments.
Figure 5C:
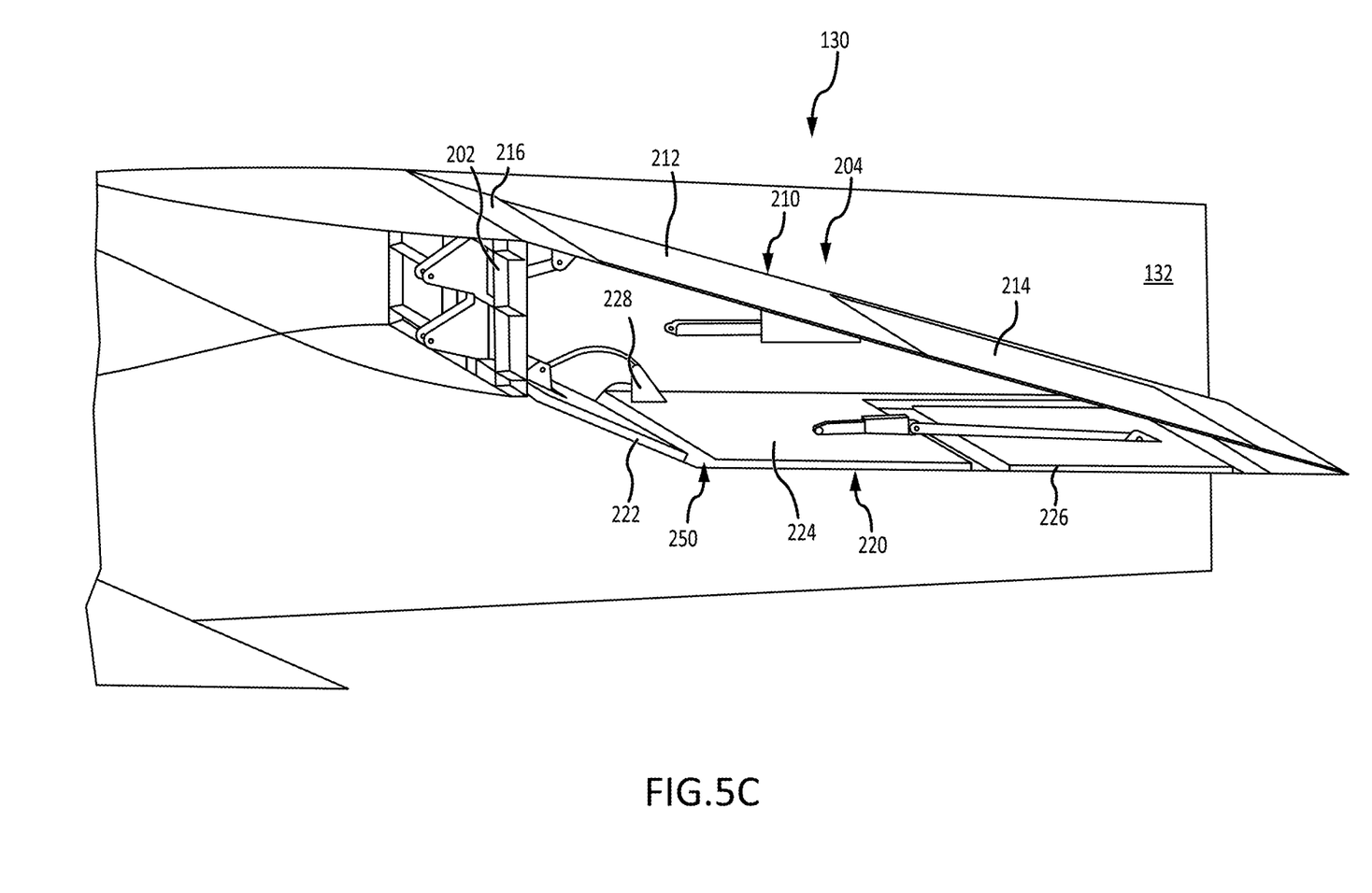
FIG. 5C provides a perspective section view of the upper quadrant of the thrust reverser of FIG. 5A in a third position, in accordance with various embodiments.
Figure 5D:
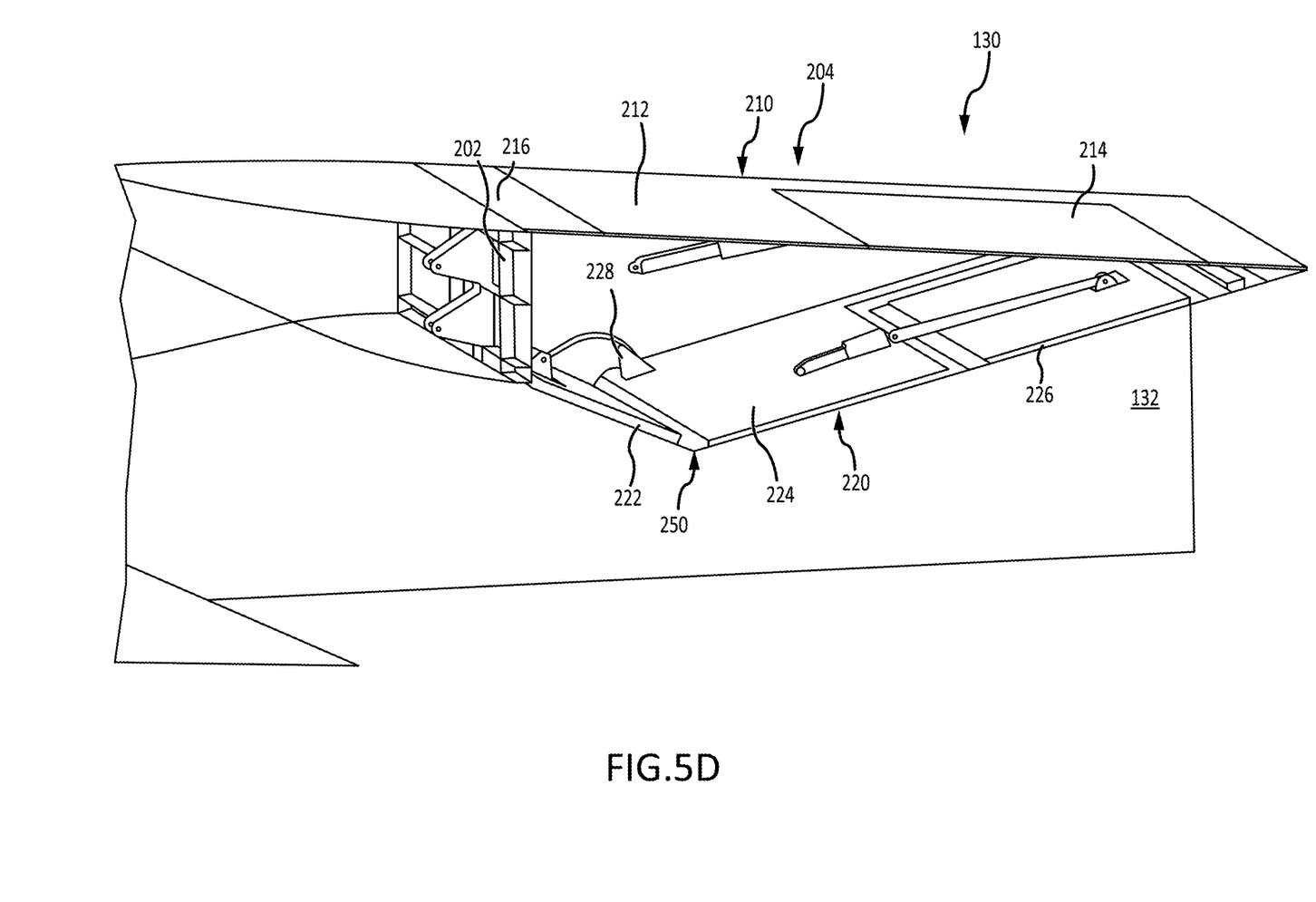
FIG. 5D provides a perspective section view of the upper quadrant of the thrust reverser of FIG. 5A in a fourth position, in accordance with various embodiments.
Figure 5E:
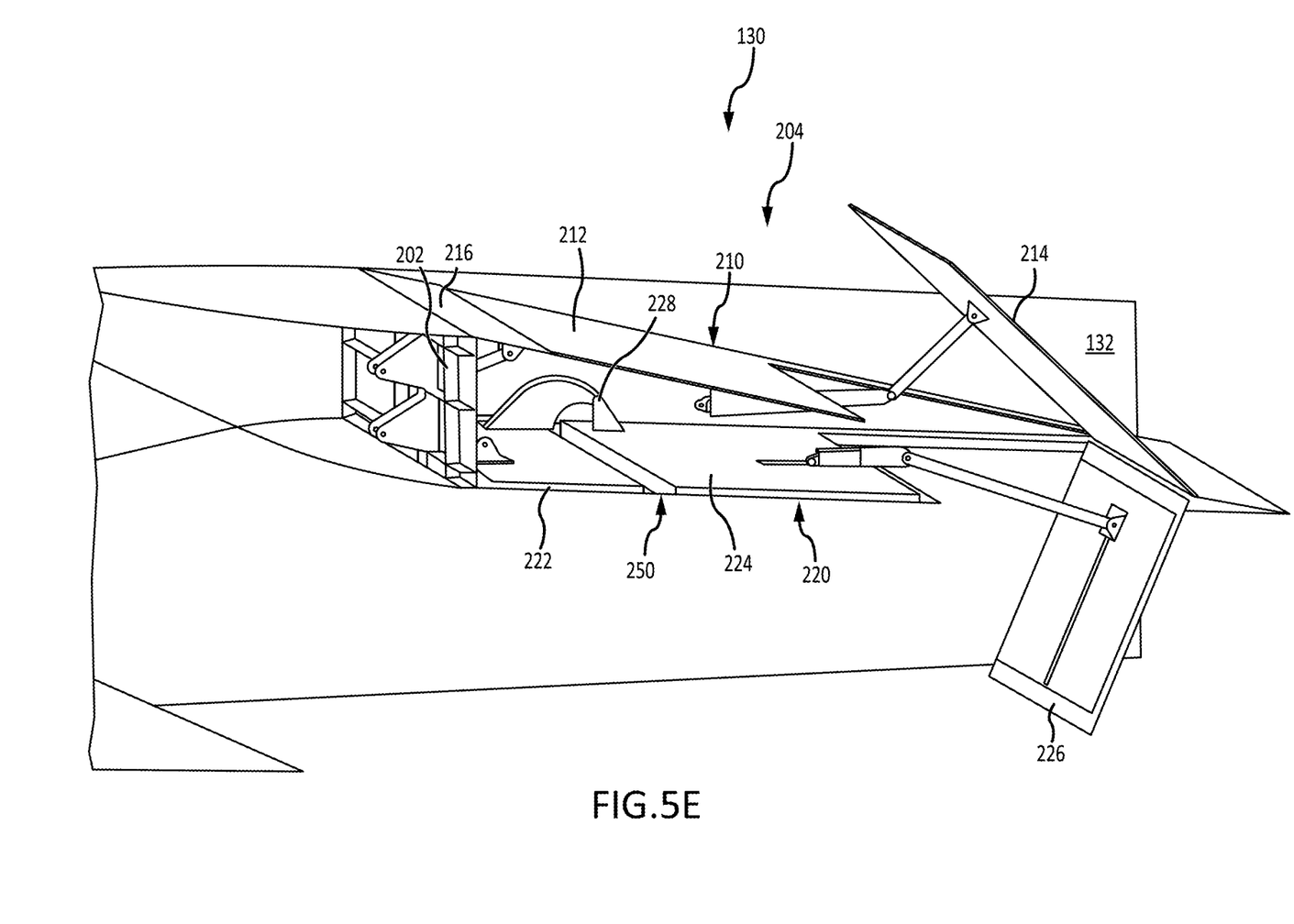
FIG. 5E provides a perspective section view of the upper quadrant of the thrust reverser of FIG. 5A with the thrust reverser doors in deployed positions, in accordance with various embodiments.

Thrust reverser 130 may further include a first thrust reverser actuator 234 configured to move the outer thrust reverser door 214 between a stowed position (see FIG. 4A and FIG. 5A) and a deployed position (see FIG. 5E). First thrust reverser actuator 234 may be a linear actuator. First thrust reverser actuator 234 may be configured to actuate outer thrust reverser door 214 to pivot with respect to outer skin 212 independent of the position of outer skin 212.

Thrust reverser 130 may further include a second thrust reverser actuator 236 configured to move the inner thrust reverser door 226 between a stowed position (see FIG. 4A and FIG. 5A) and a deployed position (see FIG. 5E). Second thrust reverser actuator 236 may be a linear actuator. Second thrust reverser actuator 236 may be configured to actuate inner thrust reverser door 226 to pivot with respect to aft inner skin 224 independent of the position of aft inner skin 224. In this regard, first nozzle actuator 230, second nozzle actuator 232, first thrust reverser actuator 234, and second thrust reverser actuator 236 may each be independently and individually operated to independently control one or more of nozzle throat area A8 (see FIG. 1B), nozzle exit area A9 (see FIG. 1B), and/or thrust reversal.

Thrust reverser 130 may further include a flap 216 between outer skin 212 and forward bulkhead 202. Flap 216 may be pivotally coupled to forward bulkhead 202. Flap 216 may be slidingly coupled to outer skin 212 to provide a continuous aerodynamic surface between outer skin 212 and forward bulkhead 202 (and/or the nacelle skin located thereon). Flap 216 may provide a sliding connection between flap 216 and outer skin 212 to maintain said continuous, aerodynamic surface as outer skin 212 pivots between various angular positions with respect to forward bulkhead 202.

Stated differently, flap 216 may form an articulating bridge between outer skin 212 and forward bulkhead 202 to maintain a smooth aerodynamic surface therebetween. Outer skin 212 may translate with respect to flap 216 in response to the angle of the outer skin 212 varying with respect to the forward bulkhead 202 to maintain said continuous aerodynamic outer surface of the exhaust nozzle 130.

Figure 4B:
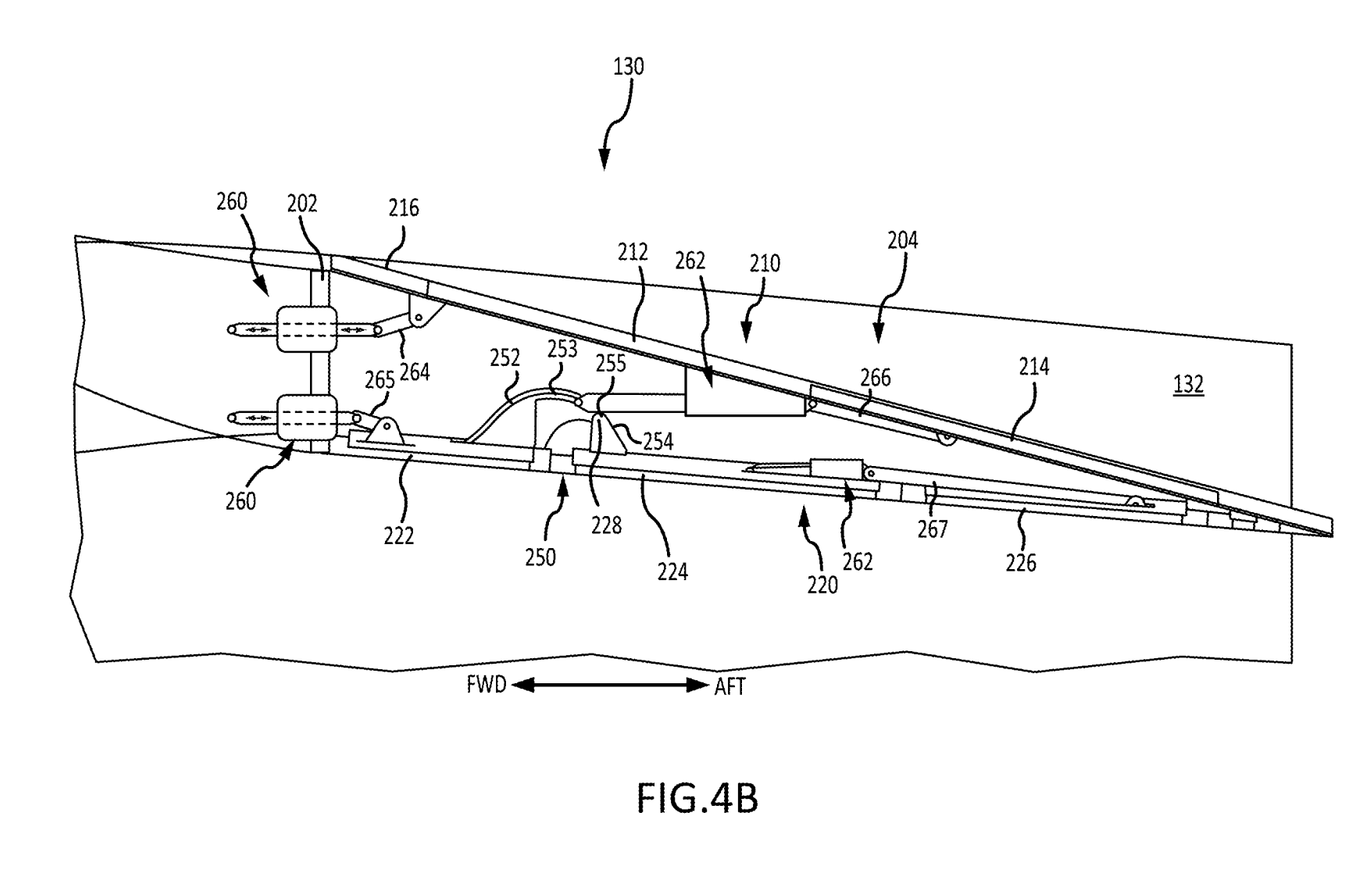
FIG. 4B provides a section view of the upper quadrant of the thrust reverser of FIG. 4A with the actuators omitted, in accordance with various embodiments.

Thrust reverser 130 may further include a sliding joint 228 radially offset from the interface 250 between the forward inner skin 222 and the aft inner skin 224. The forward inner skin 222 and the aft inner skin 224 may be coupled together at the sliding joint 228. With reference to FIG. 4B, thrust reverser 130 is illustrated with the actuators omitted for clarity purposes. Sliding joint 228 may include a first attachment bracket 252 extending from forward inner skin 222 and a second attachment bracket 254 extending from aft inner skin 224. First attachment bracket 252 may include a track 253 and second attachment bracket 254 may include a pin 255 configured to ride within track 253. In this manner, the angular rotation of forward inner skin 222 with respect to aft inner skin 224 is supported and guided by sliding joint 228. It is further contemplated herein that other types of hinges may be used at the interface 250 between forward inner skin 222 and aft inner skin 224, such as a piano hinge for example. Moreover, the aft ends of aft inner skin 224 and outer skin 212 may be pivotally coupled together with a hinge, such as a piano hinge or any other suitable hinge. Likewise, the forward ends of flap 216 and/or forward inner skin 222 may be pivotally coupled to bulkhead 202 with a hinge of a suitable type.

Each nozzle actuator (i.e., first nozzle actuator 230 and second nozzle actuator 232) may be coupled to its respective panel or skin via a linear joint (i.e., linear joints 260). Each linear joint 260 may be configured to transmit lateral loads between the forward bulkhead 202 and the respective panel or skin. Linear joint 260 may comprise a housing fixed with respect to forward bulkhead 202 and a translating link configured to reciprocally translate along a single axis in response to the associated actuator extending and/or retracting. In this manner, the respective nozzle actuator may experience only longitudinal loads, which may tend to extend the life of the actuator and/or maximize efficiency of the actuator. Each thrust reverser actuator (i.e., first thrust reverser actuator 234 and second thrust reverser actuator 236) may similarly be coupled to its respective thrust reverser door via a linear joint (i.e., linear joints 262).

Referring now to FIG. 5A through FIG. 5E, a kinematic model illustrating articulating exhaust nozzle door 204 in various positions is provided with the actuators omitted for ease of illustration. Thrust reverser 130 may guide mixed flow exhaust gasses comprising both air passing through the bypass flow path B and combustion gases exiting the core flow path C. The positions shown in FIG. 5A through FIG. 5D represent discrete nozzle positions during the mission of an aircraft. It should be understood that the present disclosure allows for intermediary nozzle positions within the limits expressed herein.

With reference to FIG. 5A, articulating exhaust nozzle door 204 is illustrated in a first position with the forward inner skin 222 substantially in parallel with the aft inner skin 224. In various embodiments, articulating exhaust nozzle door 204 may be in the first position during takeoff.

With reference to FIG. 5B, articulating exhaust nozzle door 204 is illustrated in a second position with the forward inner skin 222 substantially in parallel with the aft inner skin 224 and the articulating exhaust nozzle door 204 pivoted inward with respect to the first position. In various embodiments, articulating exhaust nozzle door 204 may be in the second position during takeoff at an elevated altitude with respect to the first position. First nozzle actuator 230 and second nozzle actuator 232 may be activated in concert (i.e., simultaneously) to move articulating exhaust nozzle door 204 from the first position to the second position. First nozzle actuator 230 and second nozzle actuator 232 may extend to move the articulating exhaust nozzle door 204 from the first position to the second position to reduce the nozzle exit area. More particularly, first nozzle actuator 230 may be powered to extend to pivot outer skin 212 inward and second nozzle actuator 232 may be powered to extend to pivot forward inner skin 222 and aft inner skin 224 inward. In various embodiments, outer skin 212, forward inner skin 222, and aft inner skin 224 may pivot inward together from the first position to the second position. Stated differently, outer articulating panel 210 may be configured to pivot with respect to forward bulkhead 202 to vary the nozzle exit area.

With reference to FIG. 5C, articulating exhaust nozzle door 204 is illustrated in a third position with the forward inner skin 222 at an angle with the aft inner skin 224 and the forward inner skin 222 pivoted inward with respect to the second position. In various embodiments, articulating exhaust nozzle door 204 may be in the third position during a climb condition. In this regard, in the third position, nozzle throat area is reduced while the nozzle exit area remains substantially the same with respect to the second position. First nozzle actuator 230 and second nozzle actuator 232 may both operate in concert with one another (i.e., simultaneously) to move the articulating exhaust nozzle door 204 from the second position to the third position. First nozzle actuator 230 may retract and second nozzle actuator 232 may extend to move the articulating exhaust nozzle door 204 from the second position to the third position. Outer skin 212 may remain substantially in the same orientation as the second position when the articulating exhaust nozzle door 204 moves to the third position, except that first nozzle actuator 230 may retract slightly to accommodate for the change in total length (i.e., the linear distance between forward bulkhead 202 and the aft tip of aft inner skin 224) of the inner articulating panel 220 and to maintain the nozzle exit area. In this manner, outer skin 212 may translate forward with respect to flap 216 when articulating exhaust nozzle door 204 moves from the second position to the third position.

With reference to FIG. 5D, articulating exhaust nozzle door 204 is illustrated in a fourth position with the forward inner skin 222 at an angle with respect to the aft inner skin 224 and the aft inner skin 224 and outer skin 212 pivoted outward with respect to the third position. In various embodiments, articulating exhaust nozzle door 204 may be in the fourth position during a cruise condition. In this regard, in the fourth position, nozzle exit area is increased while the nozzle throat area remains substantially the same with respect to the third position. First nozzle actuator 230 may retract while second nozzle actuator 232 remains in place to move the articulating exhaust nozzle door 204 from the third position to the fourth position. In this regard, outer skin 212 may be pivoted outward to increase the nozzle exit area. The trailing edge of aft inner skin 224 may pivot about interface 250 with outer skin 212, while forward inner skin 222 remains stationary with respect to forward bulkhead 202. Stated differently, outer skin 212 may be configured to pivot with respect to the forward bulkhead 202 independent of the forward inner skin 222. In this regard, outer articulating panel 210 may be configured to pivot with respect to forward bulkhead 202 to vary the nozzle exit area.

With reference to FIG. 5E, articulating exhaust nozzle door 204 is illustrated in the first position with the first thrust reverser door 214 and the second thrust reverser door 226 in the deployed positions. In various embodiments, first thrust reverser door 214 and second thrust reverser door 226 may be in the deployed positions during a landing event. In this manner, exhaust gasses are redirected from flowing in an aft direction to a forward direction to generate reverse thrust to an aircraft. First thrust reverser actuator 234 and second thrust reverser actuator 236 may extend to move the first thrust reverser door 214 and second thrust reverser door 226 from the stowed position to the deployed position.

Figure 6:
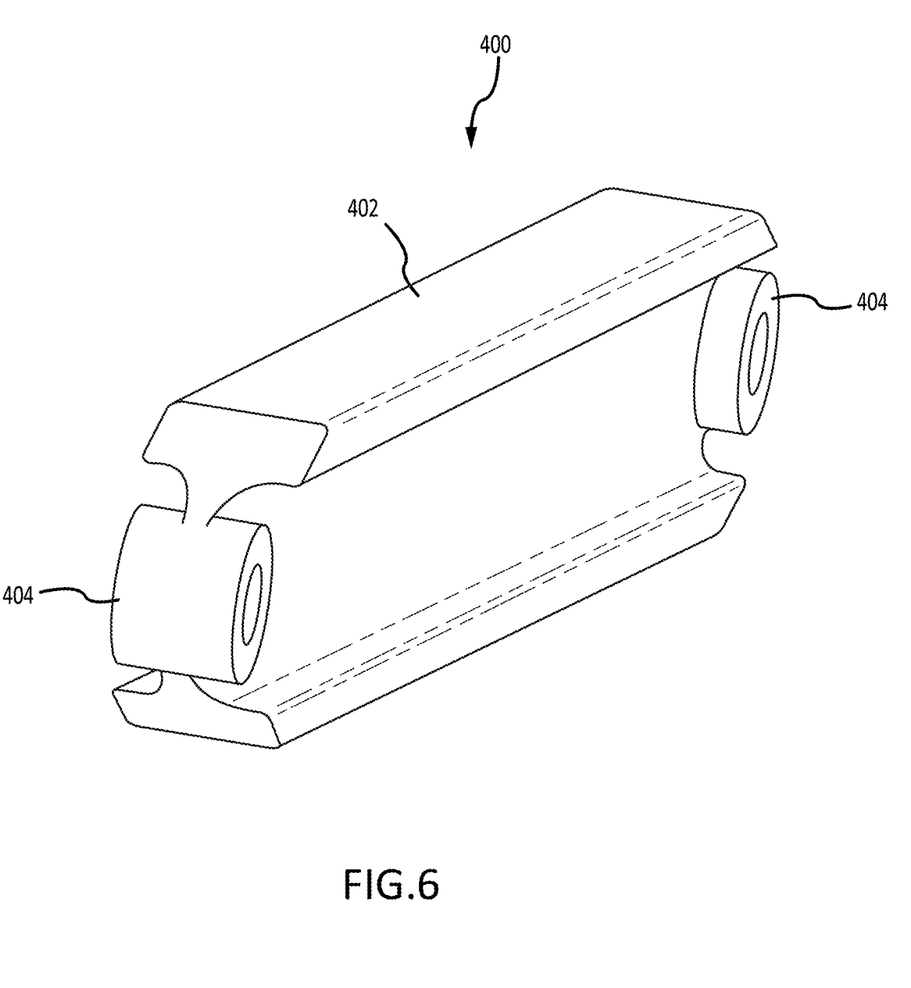
FIG. 6 provides a perspective view of a translating link for use with an actuator of the thrust reverser arrangement, in accordance with various embodiments.

With reference to FIG. 6, a sliding joint link 400 is illustrated, in accordance with various embodiments. Link 400 may be the translating link of linear joint 260 (see FIG. 4B). Link 400 may comprise a rod 402 having a substantially "I"-shaped cross-section and may terminate at both ends with connection features 404. The connection features 404 may include apertures for forming a pivoting joint to couple to links (e.g., see links 264, 265, 266, 267) pivotally coupled to the associated panels or skins.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for articulating an exhaust nozzle to vary at least one of a nozzle throat area and a nozzle exit area, the method comprising:

moving a first nozzle actuator to vary an angle of an outer articulating panel of the exhaust nozzle with respect to a forward bulkhead and to at least one of maintain or vary the nozzle exit area;

moving a second nozzle actuator to vary an angle of an inner articulating panel of the exhaust nozzle with respect to the forward bulkhead;

varying an angle between a forward inner skin of the inner articulating panel and an aft inner skin of the inner articulating panel in response to performing the step of moving the second nozzle actuator to at least one of maintain or vary the nozzle throat area;

moving a first thrust reverser actuator to pivot an outer thrust reverser door between a stowed position and a deployed position, wherein the outer thrust reverser door is pivotally mounted to an outer skin of the outer articulating panel; and moving a second thrust reverser actuator to pivot an inner thrust reverser door between a stowed position and a deployed position, wherein the inner thrust reverser door is pivotally mounted to the aft inner skin of the inner articulating panel.

2. The method of claim 1, further comprising:

translating the outer skin with respect to a flap in response to varying the angle of the outer articulating panel of the exhaust nozzle with respect to the forward bulkhead to maintain a substantially continuous aerodynamic outer surface of the exhaust nozzle;

wherein the flap is pivotally coupled to the forward bulkhead; and the outer skin is slidingly coupled to the flap.

3. The method of claim 1, further comprising pivoting the outer skin of the outer articulating panel with respect to the forward bulkhead independent of the forward inner skin of the inner articulating panel.

* * * * *